Oct. 2, 1923.

1,469,547

F. TORKA ET AL

FOCUSING ATTACHMENT FOR FOLDING CAMERAS

Filed Nov. 13, 1920    2 Sheets-Sheet 1

Inventor
Frank Torka
Paul H. C. Redders

By Mason Fenwick Lawrence,
Attorneys

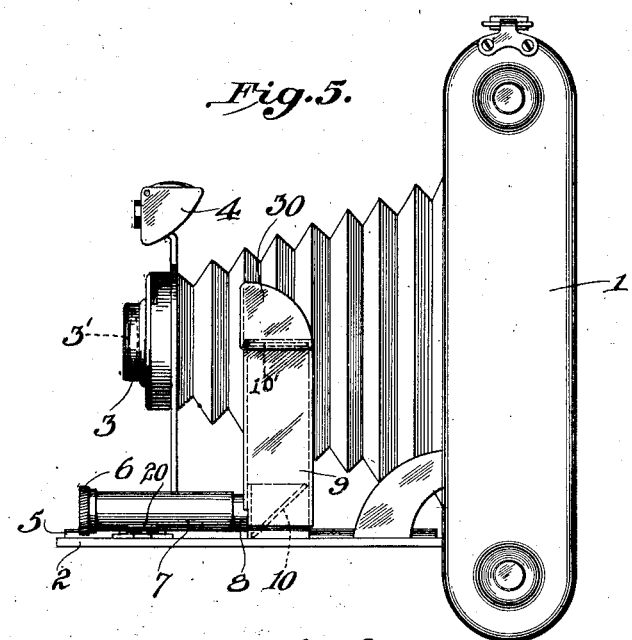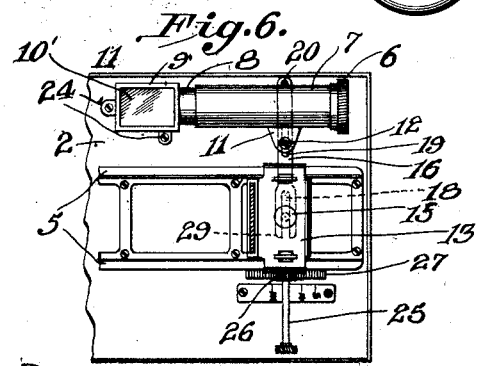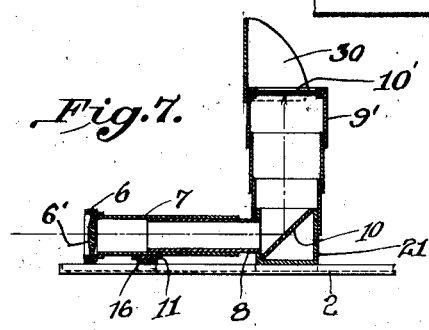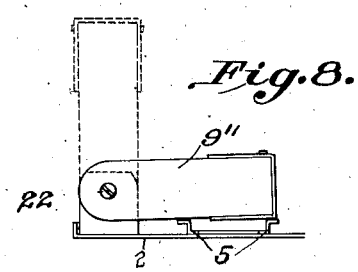

Patented Oct. 2, 1923.

1,469,547

UNITED STATES PATENT OFFICE.

FRANK TORKA AND PAUL H. C. REDDERS, OF PORT TOWNSEND, WASHINGTON, ASSIGNORS TO PORT TOWNSEND CAMERA CO., OF PORT TOWNSEND, WASHINGTON, A CORPORATION OF WASHINGTON.

FOCUSING ATTACHMENT FOR FOLDING CAMERAS.

Application filed November 13, 1920. Serial No. 423,850.

*To all whom it may concern:*

Be it known that we, FRANK TORKA and PAUL H. C. REDDERS, citizens of the United States, residing at Port Townsend, in the county of Jefferson and State of Washington, have invented certain new and useful Improvements in Focusing Attachments for Folding Cameras; and we do hereby declare the following to be a full, clear, and exact description of the invention, such as will enable others skilled in the art to which it appertains to make and use the same.

This invention relates to focusing devices for cameras and more particularly to focusing devices for folding or collapsible cameras.

The object of the invention is to provide a substantially accurate focusing device capable of being used with a collapsible or foldable camera, and with means for operating such a focusing device simultaneously and in proper ratio with the lens of the camera itself.

Other objects will appear and be explained more particularly in connection with the detailed description hereinafter.

The invention consists in certain novel structures, arrangements and combinations of parts hereinafter more particularly described and claimed.

Two sheets of drawings accompany this specification as part thereof in which like reference characters denote like parts throughout.

Figure 5 is a side elevation of Figure 1;

Figure 6 is a view similar to Figure 3 showing a modified form of the device;

Figures 7 and 8 are detail views of modified forms of the device.

Figure 1:
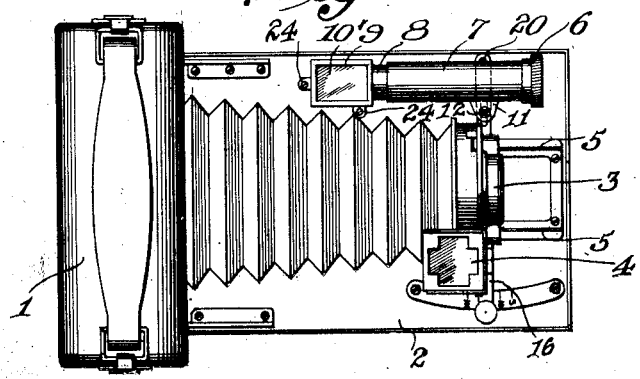
Figure 1 is a plan view of a folding camera in its open position showing one form of the improved focusing device.
Figure 2:
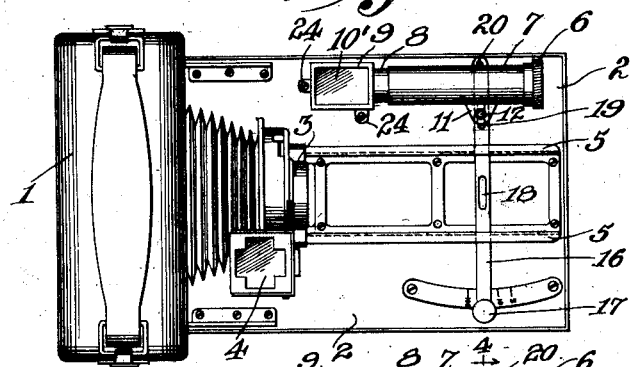
Figure 2 is a similar view with the camera lens holder only partially extended.
Figure 3:
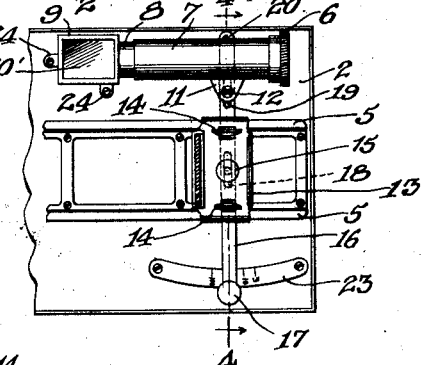
Figure 3 is a detail view of the front end of the camera door showing the supporting carriage for the camera lens partly in section.
Figure 4:
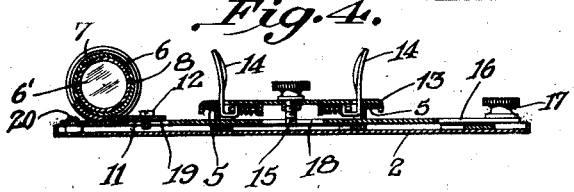
Figure 4 is a transverse sectional view taken on the line 4—4 of Figure 3.

Referring to the drawings, 1 indicates the body of the camera. 2 indicates the hinged front or door of the camera. 3 indicates the camera or service lens holder. 4 indicates the ordinary and well known finder. 5 indicates tracks fixed to the door 2 upon which service lens holder 3 is adapted to slide.

To the device thus far described, all of which is old and well known, it is proposed to apply a focusing device which consists of a focusing lens 6' carried in the member 6, which is adapted to fit over the end of a tubular member 7, which in turn slidably telescopes over a tubular member 8. The rear end of tubular member 8 communicates with box 9 within which are mounted a suitable reflector such as mirror 10, and an image receiver such as ground glass screen 10'. The member 9 is fixedly-secured to the door 2 by means of screws 24 while tubular member 7 is connected by means of a lip 11 and screw 12 to a lever arm 16 pivoted as at 20 and provided with slots 18 and 19. This lever arm 16 extends transversely across the door 2 passing through suitable slots in the tracks 5 so that it operates beneath the upper surfaces of and between the tracks. On the under carriage 13 of the lens holder 3 of the camera, there is provided a vertically adjustable screw 15 adapted to cooperate with the lever 16 through slot 18 so that, upon swinging lever 16 upon its pivot 20, focusing lens 6' and camera lens 3' will be moved forward or backward as may be desired, but always in a predetermined ratio determined by the distances between the pivot 20 and the respective points of connection of said lens to the lever. By elevating the screw 15 it can be made to entirely clear the slot 18 in the lever 16 so that the lens carrier of the camera can be folded up leaving the focusing device and the operating lever in proper position on the cover 2. In order to make the differences in focusing distinguishable to the human eye it is necessary that the focusing lens shall have at least a three inch focus and it is desirable if possible to use a five inch focus. In practice it is found desirable to use a focusing lens having two thirds the focus of the camera lens as this lends itself to proper adjustment by means of a lever arm as illustrated.

Where the space is limited the focusing device may be constructed with a totally reflecting prism or a mirror set at an angle as at 10, and a collapsible extension supporting the image receiver which may be made either with telescoping sections 9', as shown in Figure 7, or hinged and capable of being folded down, as at 9″ in Figure 8.

A modification of the proportional lever device is illustrated in Figure 6 in which the lever terminates at 29 at the end of the slot 18 and the camera lens carriage is operated by means of a rod 25 carrying a pinion 26 coacting with a rack 27, rod 25 being suitably journaled in the carriage 13.

Other modifications will readily suggest themselves to those skilled in the art.

Having described our invention, what we claim is:

1. A collapsible camera having a hinged front and a lens holder adjustable longitudinally of said hinged front in its open position, a lever pivoted adjacent one side of the hinged front near the forward edge thereof, and a focusing device having an image receiving screen, fixed to the camera front, a fixed tubular member extending therefrom, a second tubular member slidable upon said first member carrying a focusing lens, means carried by said slidable tubular member for engaging the lever, means carried by the camera lens carriage for engaging the lever, the distances between the pivot of said lever and the engaging points for connection with said focusing device and camera lens carriage being proportioned in a predetermined ratio.

2. In a collapsible camera having an adjustable lens, a focusing device comprising an adjustable focusing lens, a part fixed to the camera, a collapsible extension to said fixed part carrying an image receiving screen, means for reflecting an image from said focusing lens onto said receiving screen through said collapsible part, and means for concurrently and proportionately adjusting the camera lens and focusing lens.

3. In a collapsible camera in combination with an adjustable camera lens holder, an adjustable focusing lens, a part fixed to the camera, a collapsible extension to said fixed part carrying an image receiving screen, means for reflecting an image from the focusing lens onto the receiving screen and means for concurrently and proportionately adjusting the focusing lens and camera lens.

In testimony whereof we affix our signatures.

FRANK TORKA.
PAUL H. C. REDDERS.